(12) United States Patent
Greenwood et al.

(10) Patent No.: US 11,290,360 B2
(45) Date of Patent: *Mar. 29, 2022

(54) ANALYZING RESOURCE PLACEMENT FRAGMENTATION FOR CAPACITY PLANNING

(71) Applicant: Amazon Technologies, Inc., Seattle, WA (US)

(72) Inventors: Christopher Magee Greenwood, Seattle, WA (US); Surya Prakash Dhoolam, Seattle, WA (US); Mitchell Gannon Flaherty, Seattle, WA (US); Nishant Satya Lakshmikanth, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/257,499

(22) Filed: Jan. 25, 2019

(65) Prior Publication Data

US 2019/0158422 A1  May 23, 2019

Related U.S. Application Data

(63) Continuation of application No. 14/663,282, filed on Mar. 19, 2015, now Pat. No. 10,193,821.

(51) Int. Cl.
*H04L 12/26* (2006.01)
*H04L 12/24* (2006.01)
(Continued)

(52) U.S. Cl.
CPC ...... *H04L 43/0876* (2013.01); *H04L 41/0896* (2013.01)

(58) Field of Classification Search
CPC . H04L 41/0896; H04L 41/00; H04L 41/0823; H04L 41/12; H04L 41/147;
(Continued)

(56) References Cited

U.S. PATENT DOCUMENTS

| 7,043,250 | B1 * | 5/2006 | DeMartino | ............... | H04J 3/14 370/216 |
| 7,616,583 | B1 | 11/2009 | Power et al. | | |

(Continued)

FOREIGN PATENT DOCUMENTS

WO  WO-2014198001 A1 * 12/2014  .......... G06F 11/3447

OTHER PUBLICATIONS

U.S. Appl. No. 14/663,282, filed Mar. 19, 2015, Greenwood et al.
U.S. Appl. No. 14/625,535, filed Feb. 18, 2015, Surya Prakash Dhoolam, et al.

*Primary Examiner* — Ninos Donabed
(74) *Attorney, Agent, or Firm* — Robert C. Kowert; Kowert, Hood, Munyon, Rankin & Goetzel, P.C.

(57) ABSTRACT

A distributed system may implement analyzing resource placement fragmentation for capacity planning. Capacity planning may determine when, where, and how much capacity to implement for a distributed system that hosts resources. Placement constraints for resources may, over time, create fragmentation or stranded capacity which is available yet unusable to host new resources. Analyzing capacity fragmentation across a distributed system may allow a determination of available capacity that is actually available to host additional resources. In some embodiments, future resource placements may be estimated in order to perform capacity fragmentation analysis to determine available capacity.

20 Claims, 9 Drawing Sheets

(51) Int. Cl.
*H04L 43/0876* (2022.01)
*H04L 41/0896* (2022.01)

(58) Field of Classification Search
CPC ..... H04L 41/18; H04L 43/08; H04L 67/1029; H04L 43/0876; G06F 2009/45595; G06F 9/455; G06F 9/45558; G06F 9/50; G06F 9/5072; G06F 9/5077
See application file for complete search history.

(56) References Cited

U.S. PATENT DOCUMENTS

| | | | |
|---|---|---|---|
| 8,046,767 B2 | 10/2011 | Rolia et al. | |
| 8,332,251 B1 | 12/2012 | Morris et al. | |
| 8,738,972 B1 | 5/2014 | Bakman et al. | |
| 8,938,972 B2* | 1/2015 | Stark | B64G 1/401 239/265.11 |
| 10,193,821 B1* | 1/2019 | Greenwood | H04L 41/0896 |
| 2003/0009507 A1 | 1/2003 | Shum | |
| 2007/0043860 A1* | 2/2007 | Pabari | G06F 9/455 709/224 |
| 2007/0094375 A1 | 4/2007 | Snyder et al. | |
| 2008/0271039 A1* | 10/2008 | Rolia | G06Q 10/06 718/105 |
| 2011/0022945 A1* | 1/2011 | Yang | G06F 16/957 715/234 |
| 2011/0203259 A1* | 8/2011 | Upadhyay | F01N 13/009 60/274 |
| 2011/0314233 A1* | 12/2011 | Yan | G06F 16/24561 711/154 |
| 2014/0270762 A1* | 9/2014 | Li | H04L 45/02 398/45 |
| 2015/0178401 A1* | 6/2015 | Wilcox, Sr. | H05K 7/20836 707/758 |
| 2015/0349385 A1* | 12/2015 | Hu | H01M 10/48 429/91 |
| 2016/0093927 A1* | 3/2016 | Marcicki | H01M 10/4257 429/50 |
| 2016/0098297 A1* | 4/2016 | Yuyitung | G06F 11/3447 718/104 |
| 2016/0162338 A1 | 6/2016 | Sathyamurthy et al. | |
| 2016/0314022 A1* | 10/2016 | Pabari | H04L 67/1017 |

* cited by examiner

ANALYZING RESOURCE PLACEMENT FRAGMENTATION FOR CAPACITY PLANNING

This application is a continuation of U.S. patent application Ser. No. 14/663,282, filed Mar. 19, 2015, which is hereby incorporated by reference herein in its entirety.

BACKGROUND

The recent revolution in technologies for dynamically sharing virtualizations of hardware resources, software, and information storage across networks has increased the reliability, scalability, and cost efficiency of computing. More specifically, the ability to provide on-demand virtual computing resources and storage through the advent of virtualization has enabled consumers of processing resources and storage to flexibly structure their computing and storage costs in response to immediately perceived computing and storage needs. Virtualization allows customers to purchase processor cycles and storage at the time of demand, rather than buying or leasing fixed hardware in provisioning cycles that are dictated by the delays and costs of manufacture and deployment of hardware. Rather than depending on the accuracy of predictions of future demand to determine the availability of computing and storage, users are able to purchase the use of computing and storage resources on a relatively instantaneous as-needed basis.

Providing on-demand virtual computing resources is not without challenges. While the burden of determining adequate resources to meet computing needs is removed from customers, providers of on-demand virtual computing resources may need to predict the resource hosting capacity necessary to satisfy actual and potential customer demand. However, as customer demand for different computing resources can fluctuate, sufficient capacity for on-demand virtual computing resources may be difficult to predict. Additionally, the complexity of understanding how capacity is utilized to provide on-demand virtual computing resources can obscure capacity needs for capacity planning. Capacity planning that accurately understands the demands of customers allows providers of on-demand virtual computing resources to provide consistent and reliable on-demand virtual computing resources.

Figure 1:
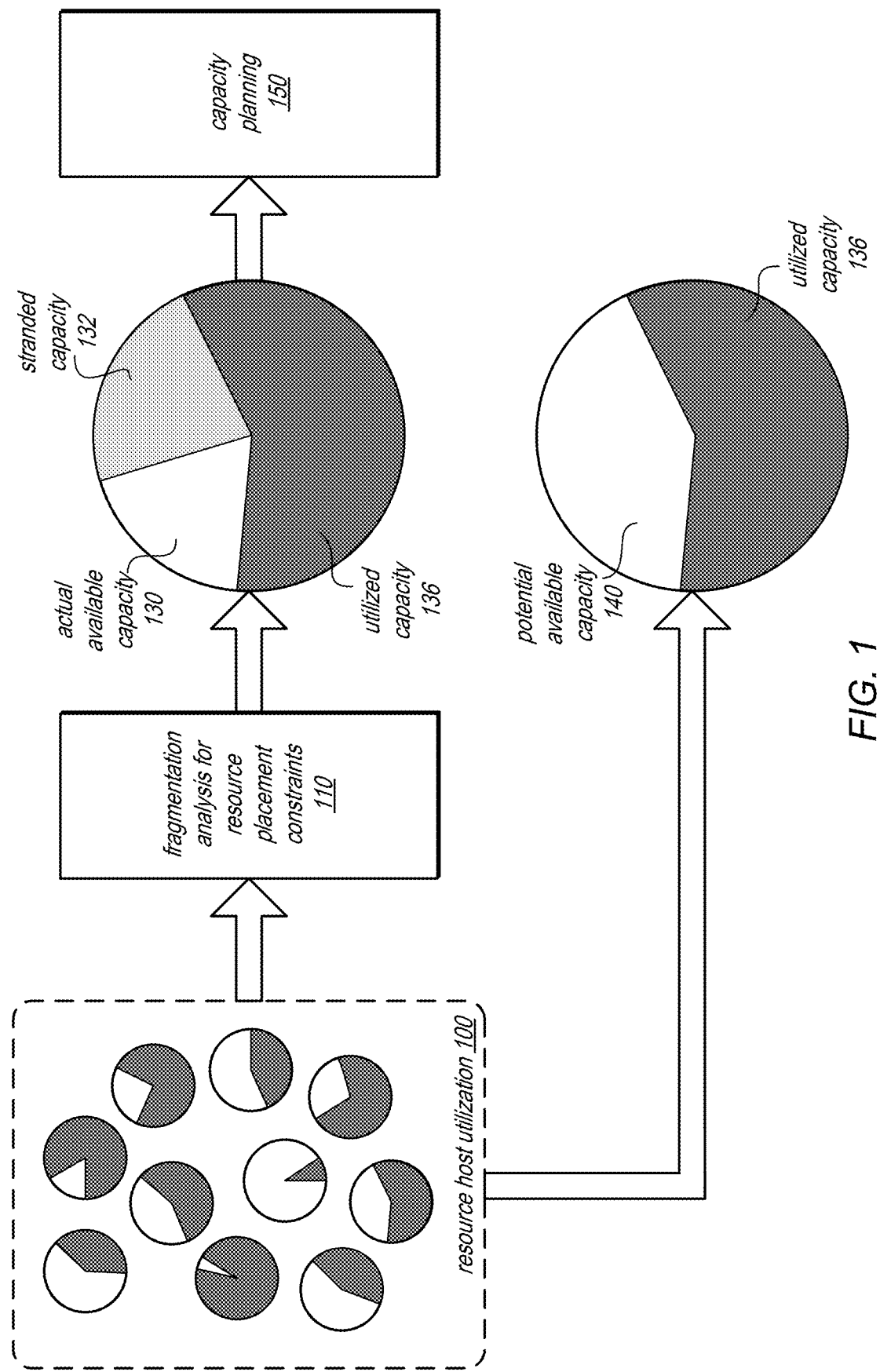
FIG. 1 illustrates analyzing resource placement fragmentation for capacity planning, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement analyzing resource placement fragmentation for capacity planning. Distributed systems may host various resources for performing or implementing different systems, services, applications and/or functions. Resources may be one of many different types of resources hosted at a resource host of a distributed system, such as one of various types of physical or virtualized computing resources, storage resources, or networking resources. For example, a storage service may host different replicas of data across a number of different resource hosts. In order to provide various performance characteristics for the resources implemented in the distributed system, placement constraints may be enforced. Placement constraints may help to avoid common failure and other performance scenarios which may reduce the availability and/or durability of resources. For instance, placement constraints that are infrastructure diversity constraints may protect, enhance, optimize or support associated resources, such as different replicas of a resource, resources working together, resources dependent on other resources, or any other resource relationship. In one such example, the storage service may implement an infrastructure diversity constraint to host the different replicas of data at different hosts on different server racks (as resource hosts (e.g., servers) on the same server rack may typically experience common failures). Placement constraints may also include one or more computing resource requirements to place a resource. For instance, continuing with the storage service example above, placement constraints may include a size or amount of storage needed for a replica of data, as well as throughput performance requirement (e.g., a number of Input/Output Operations Per Second (IOPs)).

When placing resources at resource hosts, placement constraints may be enforced. For any given resource to be placed, multiple different resource hosts may satisfy the placement constraints for the resource. In the example of the server rack diversity constraint given above, a single replica of a resource may be placed in multiple different server racks that are diverse from another server rack holding another replica of the resource. When viewed in isolation, the decision to choose a particular server rack that satisfies the server rack diversity constraint is simple. However, the effect of any one resource placement on the future capacity to place resources at other hosts in accordance with an infrastructure diversity constraint often goes unaccounted for. For example, if the example diversity constraint described above requires two replicas on resource hosts on different server racks, then consider the scenario where a single server rack with a large available capacity exists and other server racks have little to no available capacity. Even though large capacity exists on the one rack, the remaining storage capacity may be unable to store all but the smallest of replicas, limiting the number of other racks that could be used to meet the infrastructure diversity constraint of multiple racks. Capacity planning techniques that recognize the fragmented or stranded capacity effect that placement constraints may inflict upon distributed system capacity may be able to more accurately predict when additional capacity is needed and/or when other capacity management actions may need to be taken. Moreover, as discussed below with regard to FIG. 7, accounting for different possible configurations of resources (e.g., resource size and/or other capacity requirements, such as IOPS) may further refine the recognition of fragmented or stranded capacity.

FIG. 1 illustrates analyzing resource placement fragmentation for capacity planning, according to some embodiments. Resource host utilization 100 illustrates utilization data for a variety of different resource hosts of a distributed system. A simple totaling of available capacity versus utilized capacity may be determined, as illustrated at 140. However, due to placement constraints, not all available capacity is actually useable for placing new resources. Thus, such an analysis only provides potential available capacity 140 (assuming that no fragmentation exists).

Fragmentation analysis 110 may be implemented to determine capacity fragmentation across resource hosts of a distributed system, so that stranded capacity 132 is not included in actual available capacity 130 for capacity planning purposes 150. Analyzing resource utilization data for fragmentation with respect to placement constraints may be performed in various ways. For example, in various embodiments, analysis may be performed with respect to determining a number of possible resource placements that satisfy an infrastructure diversity constraint. An infrastructure diversity constraint, such as server rack diversity discussed above, may require a resource placed at resource host implemented at one infrastructure zone to have an associated resource, such as a replica, copy, related, dependent, or otherwise corresponding resource placed at resource host(s) implemented at different infrastructure zone(s). A fragmentation measure may be determined in various embodiments which indicates how much capacity remains (e.g., a number of resources that may be placed) which satisfy the infrastructure diversity requirement. In some embodiments, placement constraints may be one or multiple computing resource requirements to place a resource, such as a given type or configuration of resource, which may need to be satisfied. Analysis of capacity fragmentation according to these one or more multiple computing resource requirements may be performed as one or multi-dimensional comparisons of the capacity of a resource host to satisfy the one or multiple computing resource requirements. Fragmentation measures may be calculated, in some embodiments, which indicate the number of resources that may be placed in satisfaction of the one or more multiple computing resource requirements.

Actual available capacity 130 determined as a result of fragmentation analysis 110 may be updated in a capacity model for capacity planning 150. Capacity planning 150 may monitor available capacity and perform various responsive actions based the available capacity. If, for instance, available capacity falls below a capacity threshold, then one or more notifications may be sent indicating the state of available capacity.

Please note that previous descriptions are not intended to be limiting, but are merely provided as an example of analyzing fragmentation for resource capacity planning. Various other components may instigate or participate in fragmentation analysis and/or capacity planning. Other differences, for example, such as the number of resource hosts or ways in which utilization is measured may also be different than those illustrated in FIG. 1.

This specification begins with a general description of a provider network, which may implement analyzing fragmentation for capacity planning for resources offered via one or more network-based services in the provider network, such as data volumes offered via a block-based storage service. Then various examples of a block-based storage service are discussed, including different components/modules, or arrangements of components/module that may be employed as part of capacity management for data volumes in the block-based storage service. A number of different methods and techniques to implement analyzing fragmentation for capacity planning are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
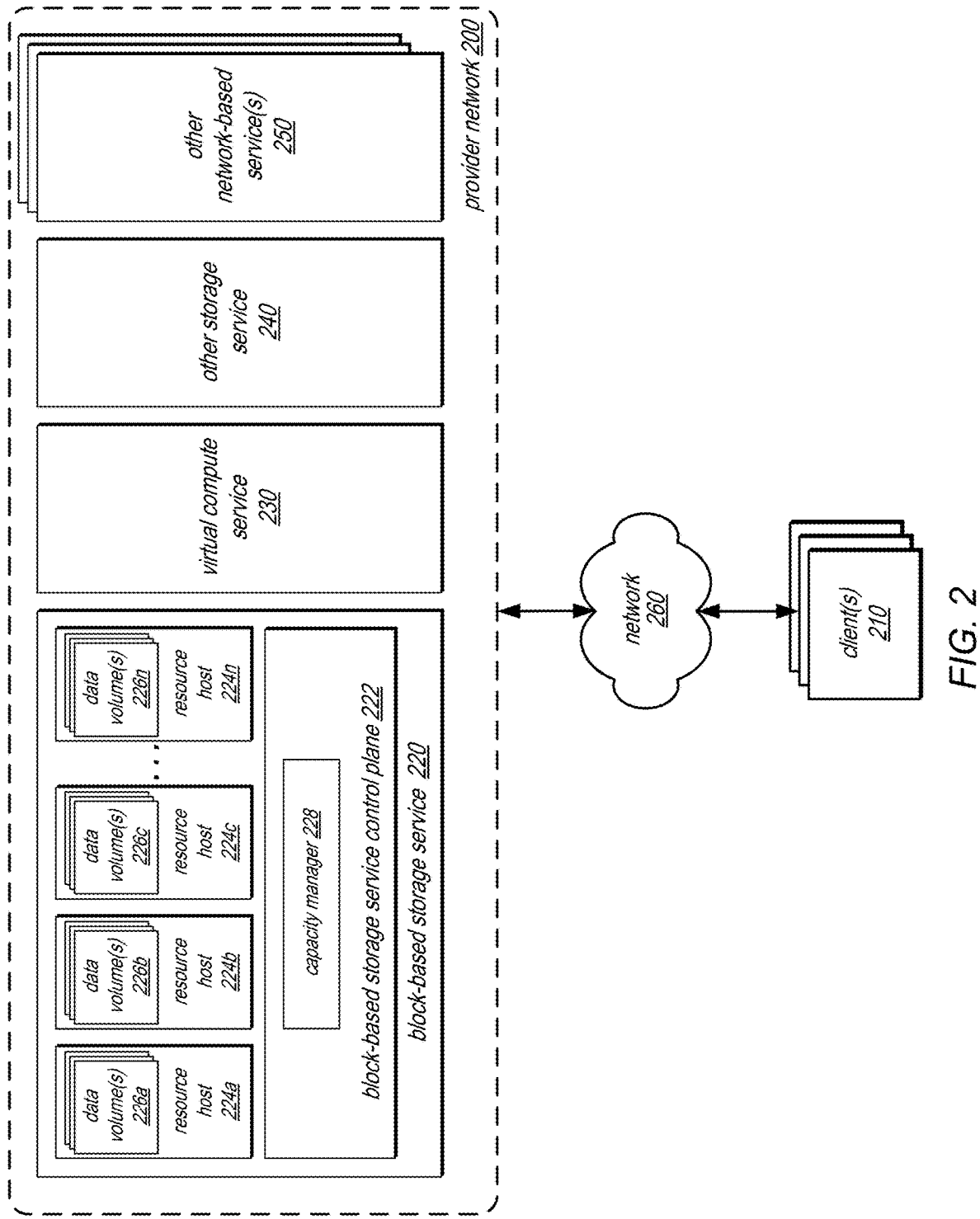
FIG. 2 is a block diagram illustrating a provider network implementing multiple network-based services including a block-based storage service that implements analyzing resource placement fragmentation for capacity planning, according to some embodiments.

FIG. 2 is a block diagram illustrating a provider network implementing multiple network-based services including a block-based storage service that implements analyzing resource placement fragmentation for capacity planning, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200. In some embodiments, provider network 200 may provide computing resources, such as virtual compute service 230, storage services, such as block-based storage service 220 and other storage service 240 (which may include various storage types such as object/key-value based data stores or various types of database systems), and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of other resources, such as particular data volumes 226, providing virtual block storage for the compute instances.

As noted above, virtual compute service 230 may offer various compute instances to clients 210. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes 226 provided by block-based storage service 220 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc . . . and (in the case of reserved compute instances) reservation term length.

In various embodiments, provider network 200 may also implement block-based storage service 220 for providing storage resources and performing storage operations. Block-based storage service 220 is a storage system, composed of a pool of multiple independent resource hosts 224a, 224b, 224c through 224n (e.g., server block data storage systems), which provide block level storage for storing one or more sets of data volumes data volume(s) 226a, 226b, 226c, through 226n. Data volumes 226 may be mapped to particular clients, providing virtual block-based storage (e.g., hard disk storage or other persistent storage) as a contiguous set of logical blocks. In some embodiments, a data volume 226 may be divided up into multiple data chunks (including one or more data blocks) for performing other block storage operations, such as snapshot operations or replication operations. A volume snapshot of a data volume 226 may be a fixed point-in-time representation of the state of the data volume 226. In some embodiments, volume snapshots may be stored remotely from a resource host 224 maintaining a data volume, such as in another storage service 240. Snapshot operations may be performed to send, copy, and/or otherwise preserve the snapshot of a given data volume in another storage location, such as a remote snapshot data store in other storage service 240.

Block-based storage service 220 may implement block-based storage service control plane 222 to assist in the operation of block-based storage service 220. In various embodiments, block-based storage service control plane 222 assists in managing the availability of block data storage to clients, such as programs executing on compute instances provided by virtual compute service 230 and/or other network-based services located within provider network 200 and/or optionally computing systems (not shown) located within one or more other data centers, or other computing systems external to provider network 200 available over a network 260. Access to data volumes 226 may be provided over an internal network within provider network 200 or externally via network 260, in response to block data transaction instructions.

Block-based storage service control plane 222 may provide a variety of services related to providing block level storage functionality, including the management of user accounts (e.g., creation, deletion, billing, collection of payment, etc.). Block-based storage service control plane 222 may further provide services related to the creation, usage and deletion of data volumes 226 in response to configuration requests. In at least some embodiments, block-based storage service control plane may implement capacity manager 228, such as described in further detail below with regard to FIG. 3. Block-based storage service control plane 222 may also provide services related to the creation, usage and deletion of volume snapshots on other storage service 240. Block-based storage service control plane 222 may also provide services related to the collection and processing of performance and auditing data related to the use of data volumes 226 and snapshots of those volumes.

Provider network 200 may also implement another storage service 240, as noted above. Other storage service 240 may provide a same or different type of storage as provided by block-based storage service 220. For example, in some embodiments other storage service 240 may provide an object-based storage service, which may store and manage data as data objects. For example, volume snapshots of various data volumes 226 may be stored as snapshot objects for a particular data volume 226. In addition to other storage service 240, provider network 200 may implement other network-based services 250, which may include various different types of analytical, computational, storage, or other network-based system allowing clients 210, as well as other services of provider network 200 (e.g., block-based storage service 220, virtual compute service 230 and/or other storage service 240) to perform or request various tasks.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
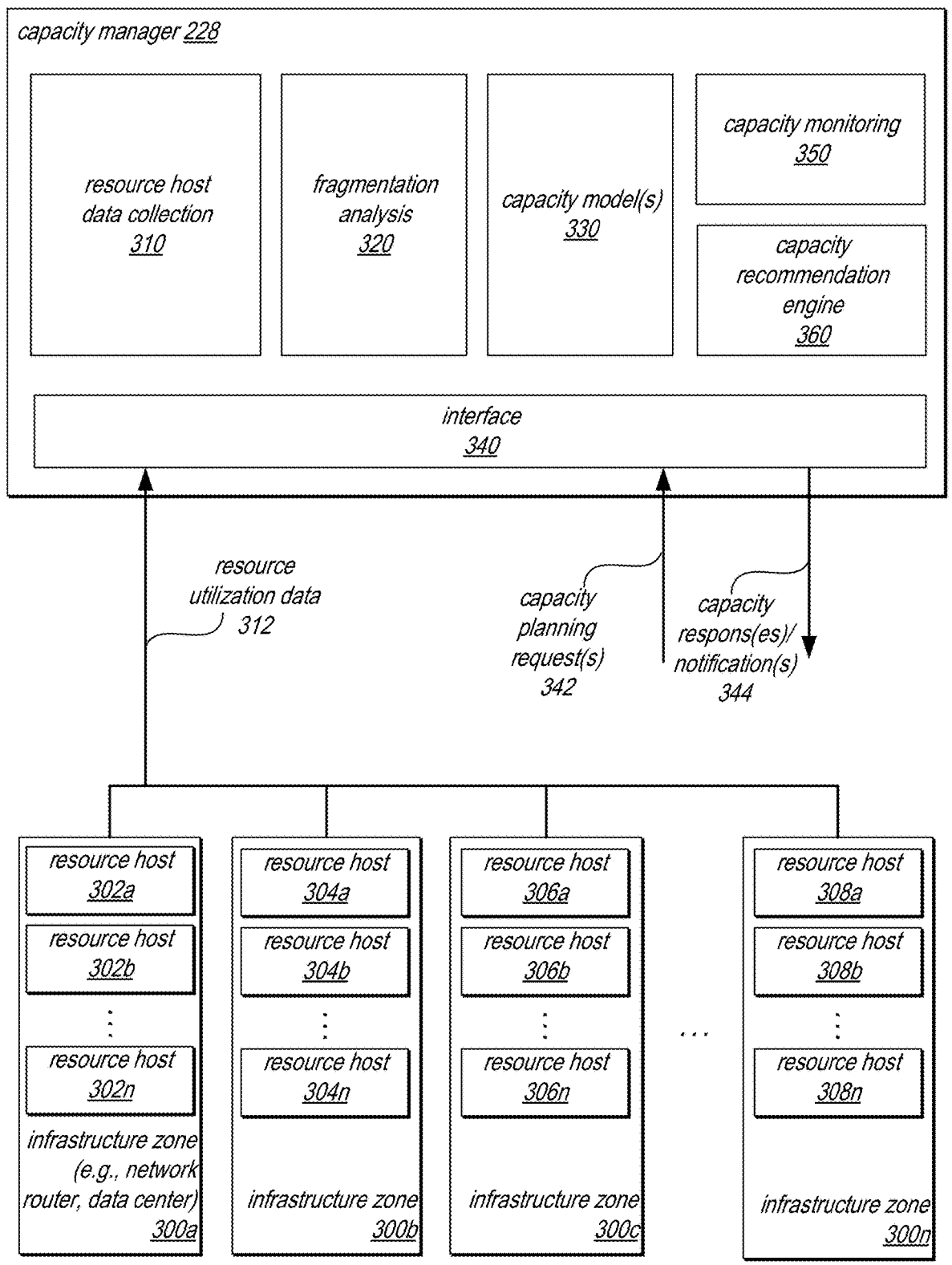
FIG. 3 is a block diagram logically illustrating a capacity manager that analyzes resource placement fragmentation for capacity planning, according to some embodiments.

FIG. 3 is a block diagram logically illustrating a capacity manager, according to some embodiments. As noted above, multiple resource hosts, such as resource hosts 302, 304, 306, and 308, may be implemented in order to provide block-based storage services. A resource host may be one or more computing systems or devices, such as a storage server or other computing system (e.g., computing system 1000 described below with regard to FIG. 9). Each resource host may maintain respective replicas of data volumes. Some data volumes may differ in size from other data volumes, in some embodiments. Resource hosts may also provide multi-tenant storage. For example, in some embodiments, resource host 306a may maintain a data volume for one account of block-based storage service 220, while another data volume maintained at resource host 406a may be maintained for a different account. Resource hosts may persist their respective data volumes in one or more block-based storage devices (e.g., magnetic disk drives or solid state drives, etc.) that may be directly attached to a computing system or device implementing the respective resource host. Resource hosts may implement different persistent storage devices. For example, some resource hosts may implement solid state drives (SSDs) for persistent block storage, while other resource hosts may implement hard disk drives (HDDs) or other magnetic-based persistent storage devices. In this way different volume types, specifications, and other performance characteristics may be provided according to the persistent storage devices implemented at the resource host.

Block-based storage service 220 may manage and maintain data volumes in a variety of different ways. Different durability schemes may be implemented for some data volumes among two or more resource hosts maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, resource hosts may then coordinate I/O requests, such as write requests, among the two or more resource hosts maintaining a replica of a data volume. For example, for a given data volume, resource host 302a may serve as a master resource host. A master resource host may, in various embodiments, receive and process requests (e.g., I/O requests) from clients of the data volume. Thus, resource host 302a may then coordinate replication of I/O requests, such as write requests, or any other changes or modifications to the data volume to one or more other resource hosts serving as slave resource hosts. For instance, resource host 308b may maintain a replica of the data volume maintained at resource host 302a. Thus, when a write request is received for the data volume at resource host 302a, resource host 302a may forward the write request to resource host 308b and wait until resource host 308b acknowledges the write request as complete before completing the write request at resource host 302a. Master resource hosts may direct other operations for data volumes, like snapshot operations or other I/O operations (e.g., serving a read request). In various embodiments, infrastructure diversity constraints may be implemented as requirements for master and slave(s) of a data volume, such as a requirement for server rack diversity between a resource host that implements a master and resource hosts that implement slave(s).

Please note, that in some embodiments, the role of master and slave resource hosts may be assigned per data volume. For example, for a data volume maintained at resource host 302b, resource host 302b may serve as a master resource host. While for another data volume maintained at resource host 302b, resource host 302b may serve as a slave resource host. Resource hosts may implement respective I/O managers. The I/O managers may handle I/O requests directed toward data volumes maintained at a particular resource host. Thus, I/O managers may process and handle a write request to volume at resource host, for example. I/O managers may be configured to process I/O requests according to block-based storage service application programming interface (API) and/or other communication protocols, such as such as internet small computer system interface (iSCSI).

As illustrated in FIG. 3, resource hosts may be implemented at different infrastructure zones 300. Infrastructure zones 300, such as server racks, networking switches, routers, or other components, power supplies (or other resource host suppliers), or physical or logical localities (e.g., locations in a particular row, room, building, data center, fault tolerant zone, server pool, etc.) may be utilized to implement resource hosts for block-based storage service 220. For example, in some embodiments infrastructure units may be server racks (e.g., infrastructure zones 300a is a server rack and resource hosts 302a through 302n are located at server rack 300a, infrastructure unit 300b is a server rack and resource hosts 304a through 304n are located at server rack 300b, infrastructure unit 300c is a server rack and resource hosts 306a through 306n are located at server rack 300c, and infrastructure unit 300n is a server rack and resource hosts 308a through 308n are located at server rack 300n). Resource hosts may be implemented at, located at, associated or grouped with multiple different infrastructure units (e.g., located at a particular server rack, in a particular data center, connected to a particular network brick or router, etc.).

Figure 6:
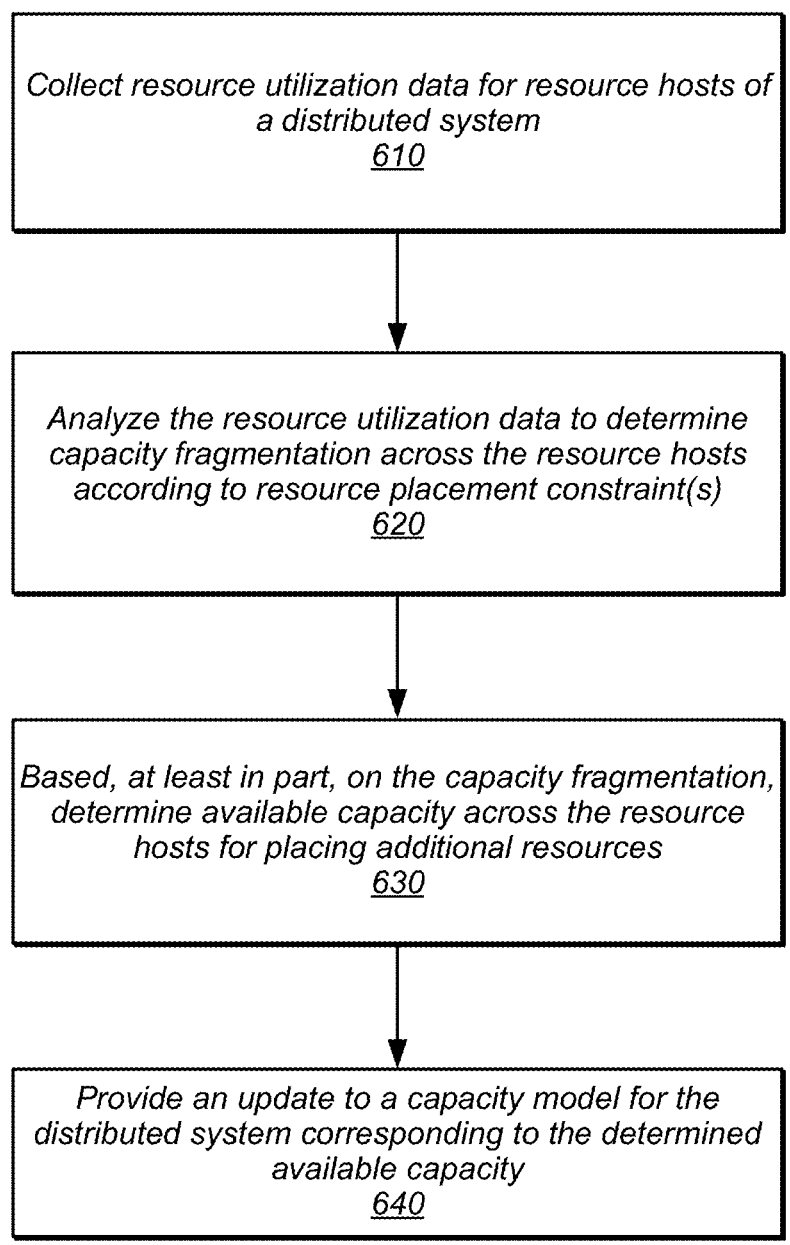
FIG. 6 is a high-level flowchart illustrating various methods and techniques for analyzing resource placement fragmentation for capacity planning, according to some embodiments.

Resource infrastructure diversity constraints, as discussed above at FIG. 1 and below with regard to FIG. 6, may be constraints that require diversity between related resources (e.g., master and slave replicas of a data volume) at different infrastructure zones. For example, a diversity constraint in some embodiments may require that a master replica be implemented at a resource host located at a different server rack (e.g., host 302a at rack 300a) than a server rack for slave replica(s) (e.g., host 306a at rack 300c). In some embodiments, infrastructure diversity constraints may be determined based on common failure scenarios or characteristics (e.g., hosts commonly fail on the same server rack, network brick/router, data center, room, etc.). Infrastructure diversity constraints may also provide for different levels of durability (e.g., number of replicas) and/or availability (e.g., location of replicas in diverse infrastructure units). Please note that while infrastructure zones $300_i$ (i=a, b, c, . . . n) are depicted as having equal numbers of resource hosts, the number or type of resource hosts may vary from infrastructure zone $300_x$ to other infrastructure zone $300_y$.

Block-based storage service control plane 222 may implement capacity manager 228, in various embodiments. Capacity manager 228 may implement interface 340 to interact with resource hosts as well as other clients, systems, or devices that provide data, control inputs, or make requests of capacity manager 228. Interface 348 may be a programmatic (e.g., application programming interface (API)) and/or graphical user interface in some embodiments.

Capacity manager 228 may implement resource host data collection 310 to request, track, query, or obtain resource utilization data 312 from resource hosts. Resource host data collection 310 may, in some embodiments, periodically sweep resource host with a query for the desired information, metrics, or metadata. For example, resource hosts may provide current utilization metrics, ongoing tasks or operations (e.g., such as migration or remirror tasks), and any other state information for the resource host, including volume specific information for volumes residing at the resource hosts. In some embodiments, resource host data collection 310 may aggregate the data according to infrastructure zones, resource hosts, or other granularities for block-based storage service 220. Resource host data collection 310 may store the collected data in one or more persistent data stores. In some embodiments, the persistent data stores may be implemented as a database or otherwise searchable/query-able storage system to provide access to the data for other components of capacity manager 228 or block-based storage service control plane 226.

Fragmentation analysis 320 may analyze resource utilization to determine capacity fragmentation across resource hosts according to placement constraints. As discussed above, the fragmentation analysis may account for placement constraints for placing resources at the resource hosts, such as infrastructure diversity constraints, one or more multidimensional computing resource requirements (e.g., storage size and/or TOPS requirements), or any other need or requirement that dictates placements at resource hosts. For example, the customer may request placement of volume of a particular storage size and TOPS requirement. Fragmentation analysis 320 may implement the various techniques discussed below with regard to FIGS. 6 and 7. For instance, fragmentation analysis 320 may determine a number of server rack diverse data volumes (e.g., 2 or more replicas of the data volume at different server racks) that may be placed with respect to a particular infrastructure zone, such as a data center or network router or brick.

Determinations of available capacity may be performed based on the fragmentation analysis and updates to capacity model(s) 330 performed, in various embodiments. For instance, different capacity models may be maintained for different infrastructure zones. Capacity monitoring 350 may be implemented as part of capacity manager 228 to evaluate available capacity in capacity model(s) 330, and perform various responsive actions, such as the various techniques discussed below with regard to FIG. 8. For instance, if the available capacity falls below a capacity threshold, a notification 344 may be sent to responsible parties via interface 340. Various other responsive actions, including requests to other control plane services, (e.g., a request to a placement service to block or redirect placements from a locality or infrastructure zone with low capacity) may be performed.

Figure 8:
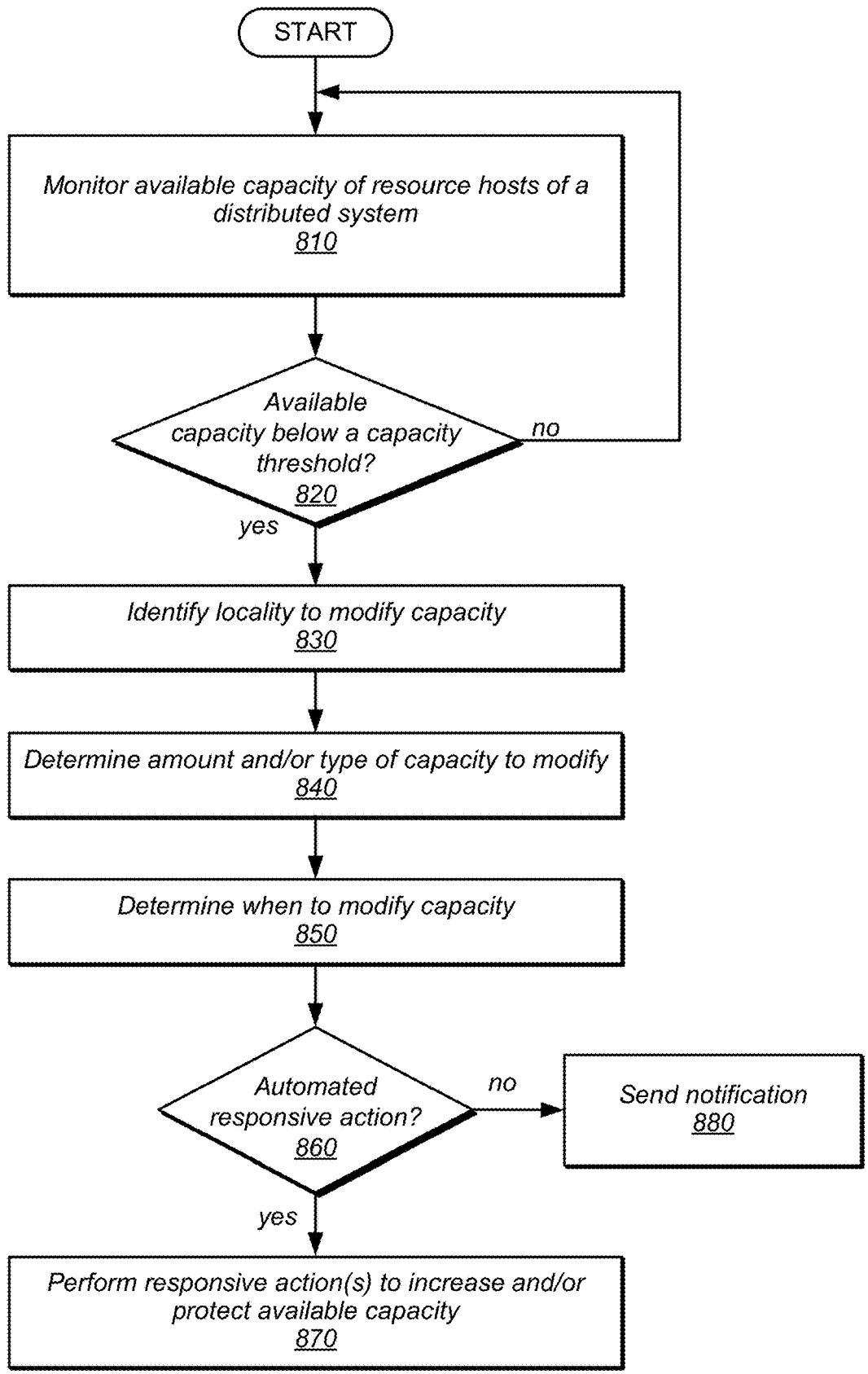
FIG. 8 is a high-level flowchart illustrating various methods and techniques for monitoring available capacity and performing responsive actions, according to some embodiments.

Capacity manager 228 may implement capacity recommendation engine 260 to generate capacity recommendations or decisions. These capacity recommendations or decisions may be generated in response to requests from user or clients 342, such described below with regard to FIG. 4, or automatically, such as when available capacity falls below a capacity threshold, such as discussed below with regard to FIG. 8. Capacity recommendations may include where capacity is to be modified (e.g., transferred from one infrastructure zone to another or added to a particular infrastructure zone), what capacity is to be modified (e.g., a particular number of resource hosts that host solid state drive backed volumes or a particular number of resource hosts that host magnetic storage backed volumes to be added or moved), and when capacity is to be modified (e.g., a timeframe or deadline before in which capacity is to be modified). FIG. 8 discusses in further detail below the various ways in which recommendations may be generated, and such techniques may be implemented by capacity recommendation engine.

Please note that while capacity manager 228 is discussed in the context of managing capacity for virtual block-based storage service 220, other services or network-based systems, such as virtual computing service 230 may implement similar capacity management systems.

Figure 4:
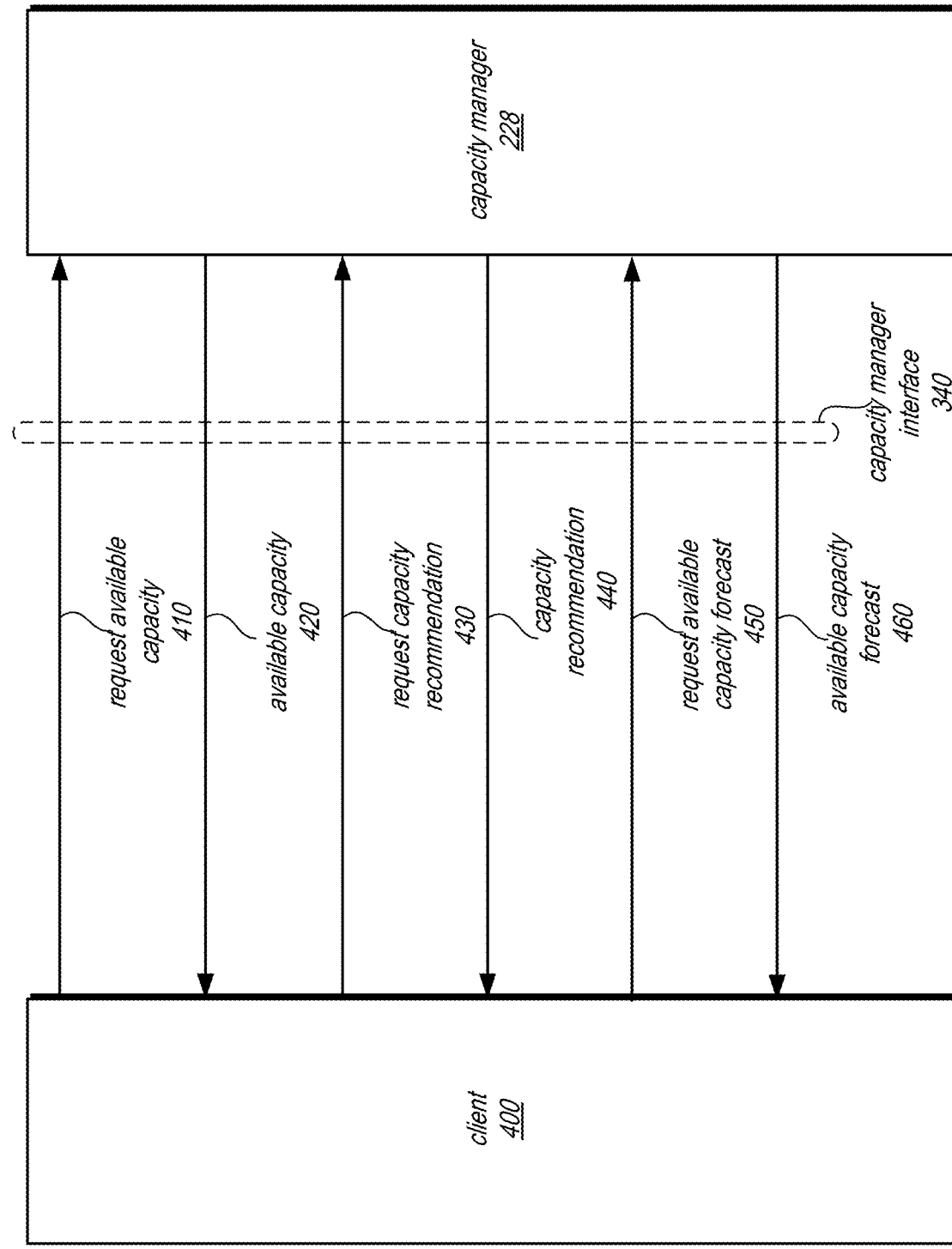
FIG. 4 is a block diagram illustrating interactions between a client and capacity manager, according to some embodiments.

FIG. 4 is a block diagram illustrating interactions between a client and capacity manager, according to some embodiments. Client 400 may be an internal client to provider network (e.g., another control plane component of virtual block-based storage service or another service of the provider network) or a client external to a provider network (e.g., a data center operator or agent) which may access the capacity model, and obtain various capacity information and recommendations, in some embodiments.

As illustrated at 410, a request for available capacity 410 may be received at capacity manager 228 via interface 340. The returned available capacity 420 may be determined based on the fragmentation of capacity across resource constraints, as discussed below with regard to FIG. 6. In some embodiments, a capacity recommendation request 430 may be received. A capacity recommendation may be generated based on the capacity model. For example, as discussed below with regard to FIG. 8, infrastructure zones or other localities with available capacity below a capacity threshold (or near a capacity threshold) may be identified. The returned recommendation 440 may include where additional capacity should be installed, where the capacity should be obtained from (e.g., new capacity or moved from another infrastructure zone), what capacity to be added (e.g., the type and/or amount of capacity, such as SSD backed resource hosts or HDD backed resource hosts), and when the capacity should be installed (e.g., an installation window or deadline). In some embodiments, a request for a capacity forecast 450 may be received. A capacity forecast may be generated according to the various techniques discussed below with regard to FIG. 7 and returned 460 to client 400. For example, the request 450 may include an amount of time into the future to predict (e.g., 1 week). The available capacity forecast returned 460 may provide a forecast of available capacity based on fragmentation for the 1 week period into the future from a time at which the forecast was generated.

Figure 5:
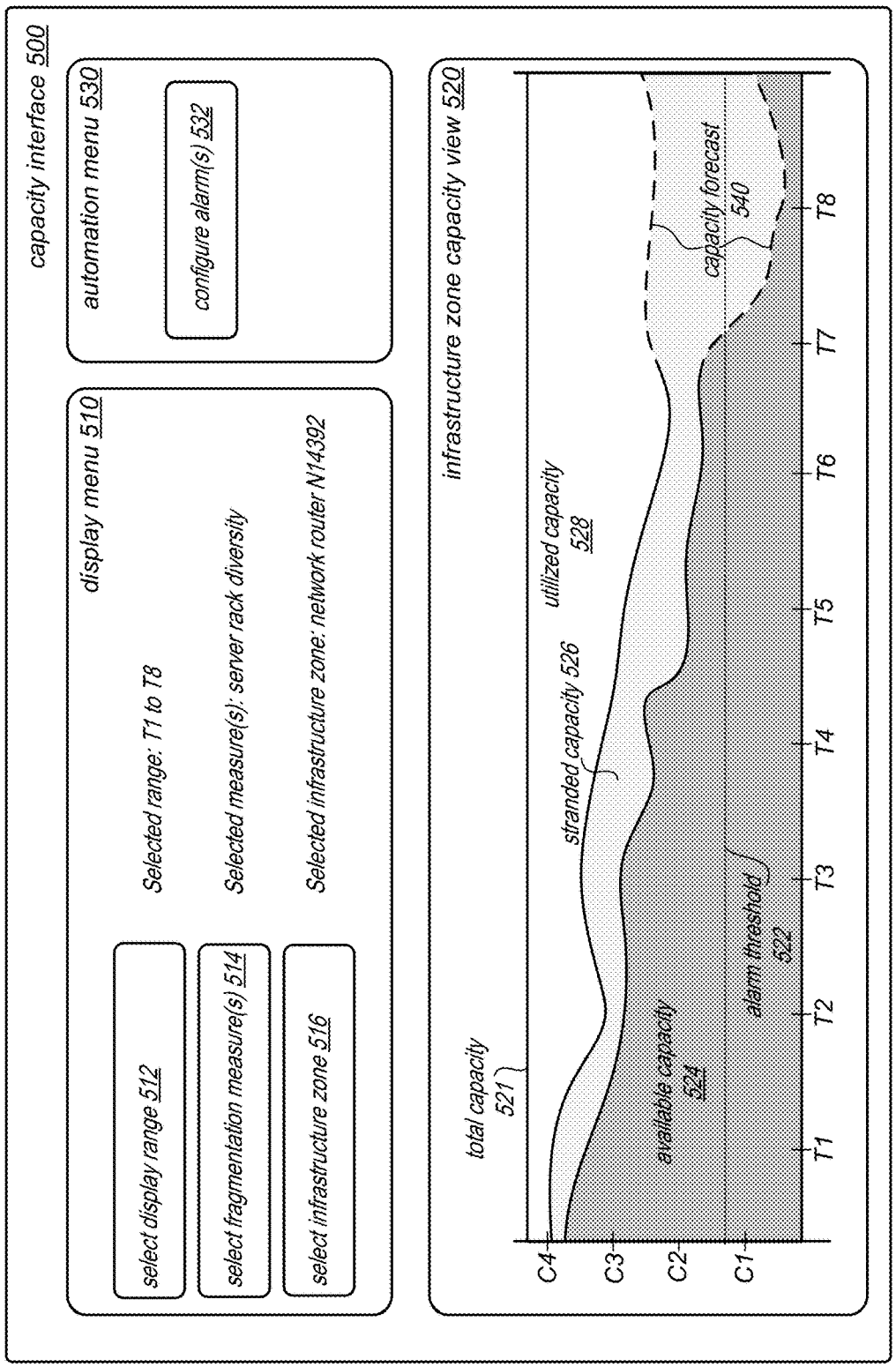
FIG. 5 is an example interface for capacity management, according to some embodiments.

The various interactions discussed above may be performed via graphical and/or programmatic interface. FIG. 5 is an example interface for capacity management, according to some embodiments. Capacity interface 500 may be a graphical interface which may be provided to clients over network connection. For instance, capacity interface 500 may be provided as network-based site (e.g., website) generated according to Hypertext Markup Language (HTML) or other network communication protocol.

Various graphical elements, controls, and features may be implemented to provide the different interactions discussed above with regard to FIG. 4. For instance, infrastructure zone capacity view 520 may be implemented to illustrate in a graph the available capacity 524 (as determined in capacity units C, which may be number of resources, or amount of a computing resource, such as storage, IOPs, or processing capacity) available to place resources. In some embodiments, available capacity may be illustrated out of total capacity 521 of the infrastructure zone. In at least some embodiments, stranded capacity 526 (e.g., capacity that is unavailable as a result of fragmentation) and utilized capacity 528 may be illustrated. Display menu 510 may be implemented, providing various input controls (e.g., drop down menus, text entry boxes, etc.) which may be used to manipulate the available capacity displayed in 524. For instance, select display range 512 may be used to adjust the period of time (e.g., T1-T8) for which available capacity is displayed. In some embodiments, different granularity of available capacity 524 may be provided. For instance, different fragmentation measures may be utilized, and displayed, which may provide the same or different indications with respect to capacity. As illustrated in FIG. 5, select fragmentation measure(s) 514 has been utilized to select server rack diversity as an infrastructure constraint for which capacity is being measured. Additionally, in some embodiments, an infrastructure zone or other locality may be selected 516, such as the selected network router illustrated in FIG. 5.

In at least some embodiments, a forecasted capacity 540 may be displayed (e.g., the portions illustrated by the dashed lines), such as may be determined according to the various techniques discussed below with regard to FIG. 7. Alarm threshold 522 may be a capacity threshold, as discussed below with regard to FIG. 8. Various responsive actions may be taken when available 524 or predicted 540 capacity falls below alarm threshold 522. In at least some embodiments, an interface may provide an automation menu 530 to perform various interactions to configure alarm(s) 532. For instance, an automated or guided configuration sequence of interfaces may be provided allowing a user to set up one or more thresholds, define responsive actions, and/or otherwise describe what responsive actions are triggered when alarm threshold 522 is crossed. Please note that the example graphical user interface discussed above is not intended to be limiting as many other forms of interfaces may be implemented to provide the various interactions between a capacity manager and a client. For instance a command line interface may be used to perform textual interactions to obtain the various capacity information and/or configure alarms for responsive actions.

The examples of analyzing resource placement fragmentation for capacity planning discussed above with regard to FIGS. 2-5 have been given in regard to a block-based storage service and/or other network-based services. Various other types or configurations of distributed systems placing resources at resource hosts may implement these techniques. For example, a backup or archive distributed storage system may determine available capacity for new data to archive or backup according to a fragmentation analysis that accounts for placement constraints, such as an infrastructure diversity constraint which may provide a certain level of durability for the new data. Different configurations of the various modules, components, systems, and or services described above that may implement analyzing resource placement fragmentation for capacity planning may be configured to evaluate utilization data for fragmentation according to placement constraints in order to determine available capacity and update a capacity model. FIG. 6 is a high-level flowchart illustrating various methods and techniques for analyzing resource placement fragmentation for capacity planning, according to some embodiments. These techniques may be implemented using a control plane, capacity manager or other component for determining and managing available capacity at resource hosts in a distributed system, as described above with regard to FIGS. 2-5.

Resources may be one of many different types of resources, such as one of various types of physical or virtualized computing resources, storage resources, or networking resources. Some resources may be part of a group of resources that make up a distributed resource. For example, a data volume of the block-based storage service described above with regard to FIGS. 2-5 may be a distributed resource that is implemented as a master replica and one or more replica slaves.

Figure 9:
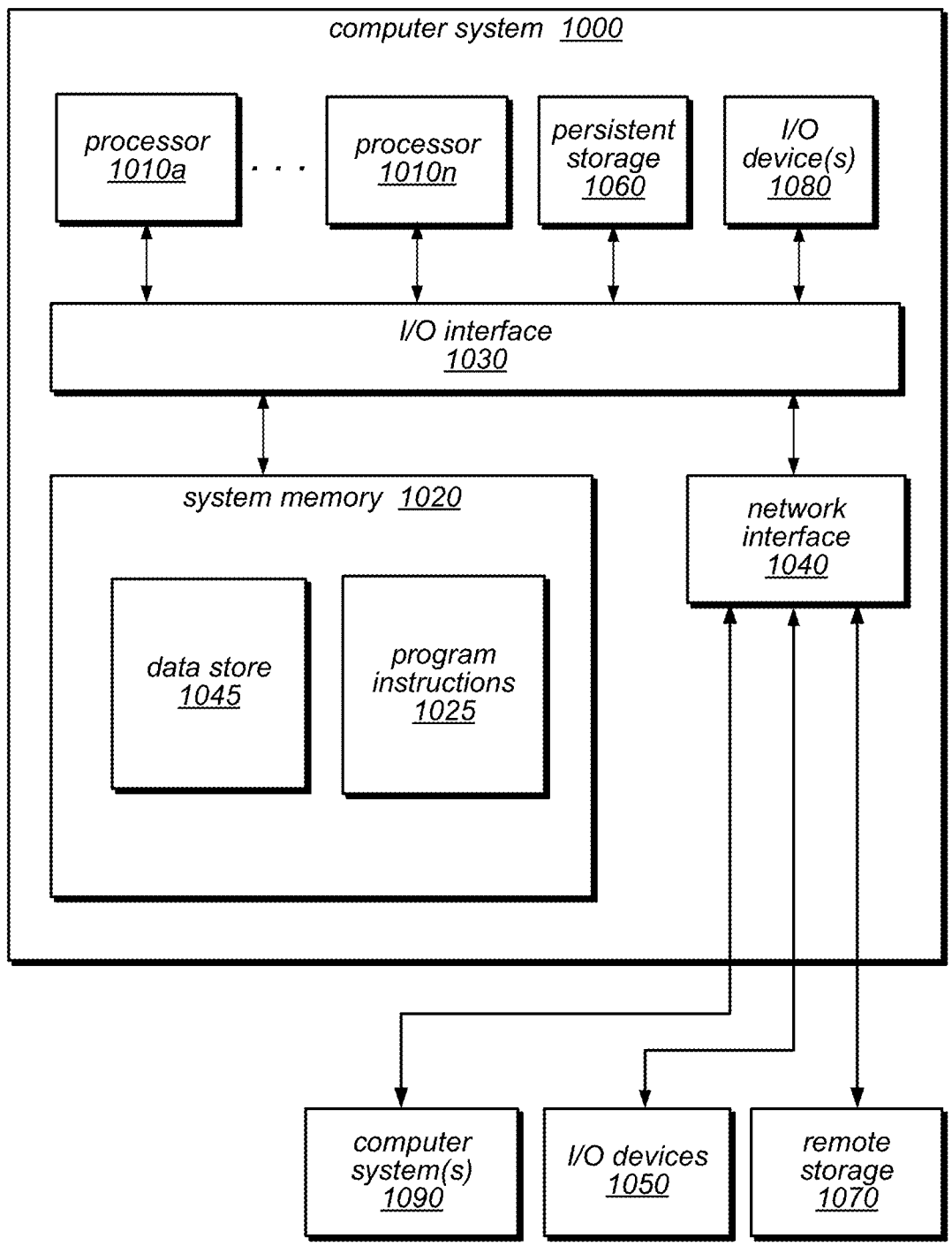
FIG. 9 is a block diagram illustrating an example computing system, according to some embodiments.

Resource hosts may be systems, components, or devices, such as system 1000 described below with regard to FIG. 9, may be configured to host the resource as part of the distributed system. Infrastructure zones or localities, such as resource hosts connected to server racks, networking switches, routers, or other components, power supplies (or other resource host suppliers), or physical or logical localities (e.g., locations in a particular row, room, building, data center, fault tolerant zone, pools or groupings of resources, etc.) may be utilized to implement resource hosts. As indicated at 610, resource utilization data for resource hosts of a distributed system may be collected. Utilization data may be collected, tracked, monitored, stored, and/or otherwise maintained for the resource hosts, which may indicate the utilization of the resource host for current resources hosted at the resource host. The utilization data may be aggregated or calculated according to the one or more resource hosts implemented at an infrastructure zone or locality (e.g., servers located at a server rack or servers connected to a network router).

As indicated at 620, the resource utilization data may be analyzed to determine capacity fragmentation across the resource hosts of the distributed system according to resource placement constraints. Resource placement constraints may be any rule, requirement, or scenario that a placement of a resource needs to satisfy in order to be placed at a resource host. For example, placement constraints may be different dimensions of configuration, operation, or other characteristic of a resource that has a minimum computing resource requirement (e.g., minimum storage size, compute capacity, network bandwidth, etc.) that resource host must satisfy in order to host the resource. A resource that is a data volume, such as discussed above, may have multiple computing resource requirements, such as storage need or size and IOPs or other throughput requirement). A virtual compute instance or other resource may similarly have one or more multiple different computing resource requirements, a requirement for high processing capacity and/or large system memory. Placement constraints may also include various prohibitions, requirements, or other rules specifying allowed or prohibit placement locations.

Some placement constraints prohibit placement locations, which may be determined based on a black list of resource hosts that are not to receive certain or any resources, in some embodiments. Placement constraints may have placement requirements that consider a potential placement location with respect to other placement location(s) of associated resource(s). Infrastructure diversity constraints, for instance, may require certain diversity of placement locations amongst associated resources. For example, as noted above, a server rack diversity constraint may be implemented for a data volume resource placement, so that one replica of a data volume may not be placed at a resource host in a server rack that also implements another resource host that hosts another replica of the data volume.

Analyzing resource utilization data for fragmentation with respect to infrastructure diversity constraints may be performed in various ways. For example, in various embodiments, analysis may be performed with respect to determining a number of possible resource placements that satisfy an infrastructure diversity constraint. As discussed above, an infrastructure diversity constraint may require a resource placed at resource host implemented at one infrastructure zone to have an associated resource, such as a replica, copy, related, dependent, or otherwise corresponding resource placed at resource host(s) implemented at different infrastructure zone(s). For instance, a resource that is a data volume may have an infrastructure diversity requirement that requires a resource be placed at two (or more) different infrastructure units (e.g., two copies of a data volume placed at resources hosts implemented at different server racks). Diversity constraints may be defined to provide various different qualities or characteristics for resources, such as durability and/or availability. A fragmentation measure may be determined in various embodiments which indicates how much capacity remains (e.g., a number of resources that may be placed) which satisfy the infrastructure diversity requirement. Consider the data volume example described above. The analysis may determine a measure which indicates the number of data volumes which may be placed among resource hosts (e.g., in a particular data center, fault tolerant zone or other group of resource hosts) satisfying an infrastructure diversity constraint for placing the data volumes (e.g., 2 copies of the data volume at different server racks). In some embodiments the evaluation may be performed by reducing from maximal groups or pairings of infrastructure units in a k-partite graph, where k is the number of infrastructure zones and each node in the graph is the capacity of a resource host to host a resource. In the data volume example above, k may be the number of server racks and each node in the graph may be the largest data volume a resource host can support. Please note that the previous example of an analysis is not intended to be limiting. Numerous other analyses of the utilization data according to an infrastructure diversity constraint may be performed, such as identifying those resource hosts that provide multiple different placement scenarios for resources to satisfy the diversity infrastructure constraint.

In some embodiments, one or multiple computing resource requirements to place resource, such as a given type or configuration of resource, may need to be satisfied. Analysis of capacity fragmentation according to these one or more multiple computing resource requirements may be performed as a one or multi-dimensional comparisons of the capacity of a resource host to satisfy the one or multiple computing resource requirements. When performing a one dimensional comparison, a single computing resource requirement (e.g., storage space, processing capacity, throughput or bandwidth) may be compared with available capacity at a resource host. If, for instance, the computing resource requirement is to host 1 Terabyte data volumes, then storage capacity may be compared with the 1 Terabyte computing resource requirement to determine a number of resources that may be placed at the host. A same comparison may be made at every resource host which is being considered to determine available capacity (e.g., in a particular locality or infrastructure zone of the distributed system). In at least some embodiments, a fragmentation measure may be calculated, such as the number of resources may be placed that satisfy the computing resource requirement. Alternatively, in some embodiments, the fragmentation measure may indicate the amount of stranded capacity that is unable to place resources (e.g., storage space remaining on resource hosts with less than 1 Terabyte of space that is unusable to place 1 Terabyte data volumes).

Performing a multi-dimensional analysis for multiple computing resource requirements may involve similar comparisons of the multiple computing resource requirements. For example, in at least some embodiments, ratios of current utilization metrics for the required computing resources may be of the candidate resource hosts (including the effect of placing the resource at the candidate resource hosts) with respective ratios of the total resource capacity (i.e., utilized and available) of the candidate resource hosts may be examined. Consider an example where the resource is a data volume, with current utilization metrics for storage utilization and throughput (e.g., IOPs). The ratio of currently utilized resources at a resource host may be modified to include the effect of placing a data volume at the resource host (e.g., including the storage size utilized (or allocated) over the utilized (or allocated) throughput of the candidate resource host). This modified ratio may then be compared to a ratio of the total capacity of the resource to provide utilization (e.g., storage size/IOP capacity) of the candidate resource host. Consider the scenario where a candidate resource host with currently utilized storage space of 20 Terabytes and currently utilized throughput of 10,000 IOPs out of a total capacity of 25 Terabytes and 12,000 IOPs. The effect of placing a 1 Terabyte data volume with a 1,500 IOPs characteristic may be included with the current utilization data to make the comparison of 21 Terabytes/11,500 IOPs with 25 Terabytes/12,000 IOPs. Fragmentation may be identified when a placement cannot be made because it creates greater difference between the two ratios. Consider another example where the current utilization ratio of bytes to TOPS of a resource host is 4/2 (=2) and the total capacity of the resource host has a ratio of 5/3 (=1.6667). If a data volume placement changes the utilization ratio to 4.5/2.5 (=1.8), then the effect of the placement at the evaluated resource host increases the similarity (e.g. 1.8 is closer to 1.6667 than 2). Thus a placement can likely be made. If, however, the data volume placement changes the utilization ration to 4.8/2.2 (=2.18182), then the effect of the placement at the candidate resource decreases the similarity (as 2.18182 is further away from 1.667 than 2). By comparing changes to current utilization metrics with respect to the capacity metrics for evaluated resource hosts, a number of additional resources that can be placed in satisfaction of the multiple resource requirements may be determined. Please note, that many other ways of comparing multiple computing resource requirements may be performed, and thus the previous example is not intended to be limiting.

As discussed below with regard to FIG. 7, in some embodiments, future resource placements may be predicted based on historical resource data. For instance the rate at which requests to place various configurations or types of resources may be evaluated to determine a mix of different resources that may be placed. The various fragmentation analysis techniques discussed above may utilize the predicted resource placements, such as the mix of different configurations, to determine the available capacity in some embodiments.

As indicated at 630, based, at least in part, on the capacity fragmentation, available capacity across the resource hosts for placing additional resources may be determined, in various embodiments. The fragmentation measures may indicate available capacity (e.g., number of resources which may be placed that satisfy a given placement constraint). In some embodiments, the fragmentation measures may indicate stranded or wasted capacity, which may be subtracted from total capacity along with utilized capacity to determine available capacity. For instance, the fragmentation measures may indicate that 200 Terabytes of storage amongst resource hosts in a data zone is unavailable due to placement constraint fragmentation (even though utilization data of the individual resource hosts may identify this storage as not utilized). This amount may be combined with the total amount of utilized storage (e.g., 600 Terabytes) to equal 800 unavailable terabytes. The total number of unavailable storage may then be subtracted from total storage (e.g., 900 Terabytes) to determine the available capacity of 100 Terabytes. In at least some embodiments, the fragmentation measure(s) may be combined and/or translated to provide an overall available capacity. For example, the lowest number of resources that may be placed as determined for multiple placement constraints may be selected as the determined available capacity (e.g., 10 resources that satisfy the multiple computing resource requirements may be placed and 8 resources may be placed that satisfy an infrastructure diversity requirement, a determination that available capacity is 8 resources may be made).

As indicated at 640, an update to a capacity model for the distributed system may be provided, in various embodiments. A capacity model may be a plan, data structure, or data store that maintains and/or indicates available capacity for a distributed system. The techniques described above may be performed for many different resource types (e.g., different types of computing resources, storage volumes, network resources, etc.) providing placement capacity for each type according to the same or different placement constraints. For instance, a determined available capacity in the above example may indicate how many data volumes backed by solid state storage devices may be placed that satisfy the two copies of the data volume at different server racks. Another measure may be determined for the number of data volumes backed by magnetic storage devices that may be placed that satisfy the two copies of the data volume at different server racks. The techniques described above may be performed to determine available capacity within different localities or infrastructure zones within a distributed system. For instance, available capacity to place additional resources in a collection of resource hosts that are connected a particular network router or brick may be determined (and monitored according to the techniques described below with regard to FIG. 8). One or more multiple capacity models may be maintained for the different localities or infrastructure zones of a distributed system in order to provide separate monitoring and other capacity management techniques. For example, capacity models may be maintained for different resource host pools that provide different types of resources (e.g., a resource host pool for solid state storage device backed data volumes and a resource host pool for magnetic storage device backed data volumes). Monitoring of capacity may account for capacity differences between infrastructure zones, and, in some embodiments, generate capacity recommendations to solve capacity problems using resources from another infrastructure zone (e.g., moving resource hosts from one infrastructure zone to another infrastructure zone).

Figure 7:
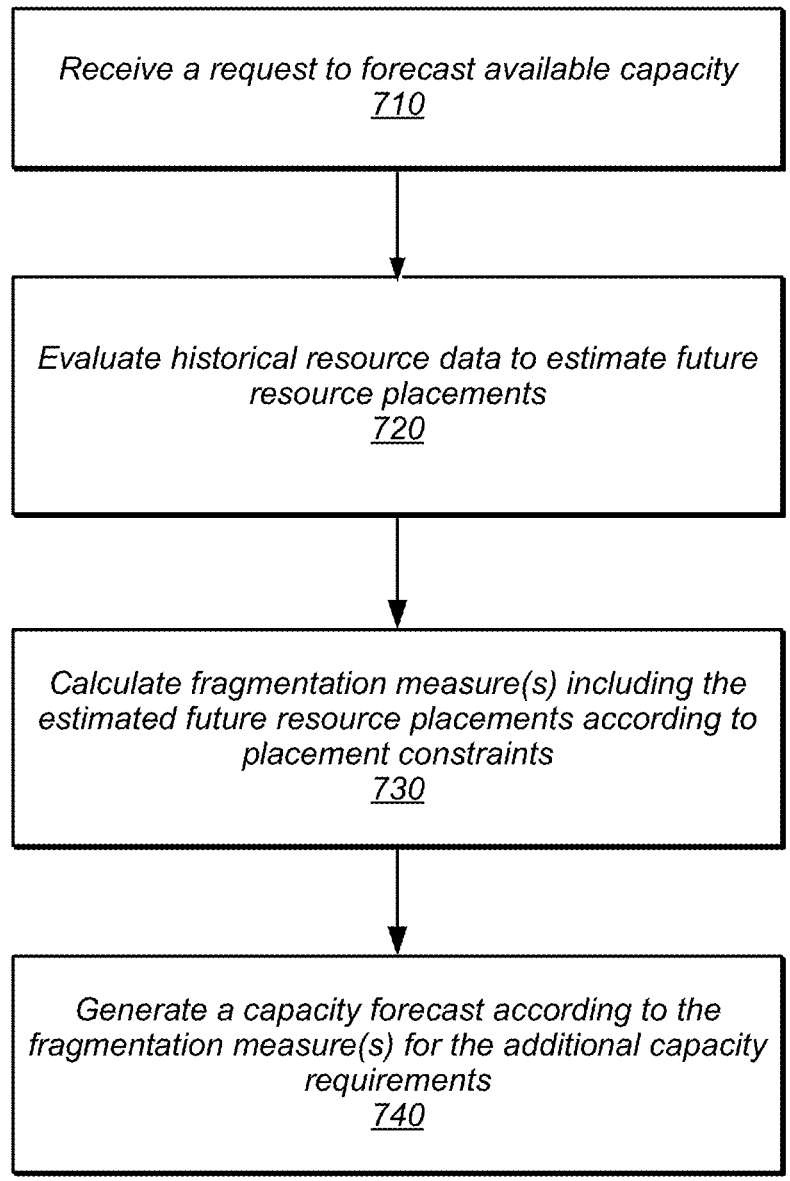
FIG. 7 is a high-level flowchart illustrating various methods and techniques for predicting available capacity according to historical resource data and fragmentation measures, according to some embodiments.

FIG. 7 is a high-level flowchart illustrating various methods and techniques for predicting available capacity according to historical resource data and fragmentation measures, according to some embodiments. As indicated at 710, a request to predict available capacity may be received, in various embodiments. The request may include a timeframe (e.g., how far into the future the prediction should be made), locality or infrastructure zone (e.g., network router, data center room, data center site, or logical group of resources), type of resource (e.g., a data volume based on a particular type of storage technology), or configuration of a resource (e.g., size of a data volume or processing capacity of a compute instance). The request, as illustrated in FIG. 4 above, may be received via an interface at a capacity manager or other service, system, or device that may determine available capacity for a distributed system. In some embodiments, the request may be received from an external client or system (e.g., external to the distributed system) or from an internal client, such as another system, service or device (e.g., a control plane system) implemented as part of the distributed system.

As indicated at 720, historical resource data may be evaluated to estimate future resource placements, in various embodiments. For example, based on the various information included in the request (a timeframe, locality or infrastructure zone, or type of resource) data for the particular type and/or configuration of resource, locality, and/or timeframe may be retrieved for analysis. Such historical information may include requests to create resources of the type, or locality, and timeframes in which the requests were received and/or performed. For example, requests to create data volumes in a virtual block-based storage service, as discussed above, may be accessed. Access and evaluation of the historical data may be specific to the type of data volume, such as a data volumes created based on particular type of storage technology like a solid state drive or magnetic disk drive. Even within same types of resources, different configurations may be accessed, such as requests to create data volumes based on a solid state drive at different sizes (e.g., 500 Gigabyte or 1 Terabyte).

Pattern recognition, machine learning, and other data analysis techniques may be applied to the historical data to determine future resource placements, in some embodiments. For example, based on an analysis of requests to create data volumes of a given type (e.g., solid state drive backed data volumes), it may be estimated that 200 total data volumes of the given type may be likely requested. In at least some embodiments, a distribution or breakdown of different configurations of the given type may be determined (e.g., 100 volumes of 500 Gigabyte size, 33 volumes of 750 Gigabyte size, 44 volumes of 900 Gigabyte size, and 23 volumes of 1 Terabyte size).

Historic resource data may include data that illustrates placement or capacity relationships between different resources. For example, the number of virtual compute instance resources placed in a given locality or infrastructure zone may be influence the number of data volume resources placed in the given locality. Evaluations of historic resource data may account for data for related, but different resources, than those resources being estimated (e.g., increasing or decreasing the number of estimated data volumes based on historic resource data concerning virtual compute instances).

Fragmentation measure(s) may be calculated including the future resource placements according to placement constraints, as indicated at 730, in various embodiments. Single dimension resource utilization fragmentation measures, multi-dimensional resource utilization fragmentation measures, infrastructure diversity constraints, or any other constraints for placing resources in the distributed system, as discussed above, may be calculated. However, instead of evaluating current resource utilization data alone, the predicted future resource placements may be included in the fragmentation measure calculation. For example, the predicted future resource placements may be indicated as a number of resources, which may be the same or different types of resources. Corresponding predicted or estimated utilization data for the predicted future resource placements may be included along with the current resource data so that the fragmentation techniques may be performed in a similar manner. For instance, multi-dimensional analysis performed for resources that have placement constraints in multiple dimensions (e.g., storage space and IOPs constraints for placing data volumes), as discussed above, may include the estimated utilization for the estimated resources. Other fragmentation measures, such as infrastructure diversity constraints, may include the numbers or configurations of estimated future resource placements. For instance, instead of calculating the number of resources that may be placed that satisfy an infrastructure diversity constraint according to one configuration of a resource, multiple predicted configurations, as well as their numbers may be considered. For instance, in the data volume example given above, different percentages or likelihoods for placing different volume sizes may be considered when determining how many volumes can be placed that satisfy an infrastructure diversity constraint (e.g., if for a next 200 volume placements, 100 volumes of 500 Gigabyte size, 33 volumes of 750 Gigabyte size, 44 volumes of 900 Gigabyte size, and 23 volumes of 1 Terabyte size may be placed).

A capacity forecast may be generated, in various embodiments, according to the fragmentation measure(s) including the future resource placements, as indicated at 740. As with the calculation of fragmentation measures, a capacity forecast may be determined in a similar manner as discussed above with regard to element 630 in FIG. 6 for determining available capacity. Capacity forecasts may be derivative of the fragmentation measure (e.g., capacity for a certain number of a given type and/or configuration data volumes may be placed at a future time that satisfy some placement criteria, such as server rack diversity). Or a capacity score or metric combining different fragmentation measures may be generated that includes the future resource placements (e.g., infrastructure diversity requirements, single or multidimensional resource utilization requirements, etc.).

Updates to a capacity model may be utilized in several different ways. As discussed above, a capacity model may be a plan or other set of one or more indicators describing the state of available capacity in the distributed system. Updates to the available capacity in the capacity model may be monitored or periodically evaluated in order to perform various responsive actions for handling changes in available capacity dynamically or automatically. FIG. 8 is a high-level flowchart illustrating various methods and techniques for monitoring available capacity and performing responsive actions, according to some embodiments.

As indicated at 810, available capacity of resource hosts of a distributed system may be monitored, in some embodiments. For example a capacity model or plan may be updated, according to the various techniques discussed above with regard to FIGS. 6 and 7, to reflect changes in utilization amongst resource hosts of the distributed system. Changes to different measures or indicators of available capacity may be periodically checked or evaluated and compared with a capacity threshold, as indicated at 820. Consider the scenario where a fragmentation measure indicates available capacity with respect to a number of resources (or a number of a certain type of resources) that may be additionally placed among resource hosts before capacity is exhausted. The capacity threshold may indicate a threshold number of resources. Likewise, various multi-dimensional fragmentation measures or diversity constraint fragmentation measures, such as those discussed above with regard to FIG. 6, may be compared with corresponding thresholds. In at least some embodiments, a generic or holistic available capacity score or metric may be utilized to indicate available capacity and be compared with a corresponding capacity score or metric threshold.

Multiple capacity thresholds may be implemented for a single or multiple different infrastructure zones, devices, groupings of devices, or other localities for which available capacity may be determined. For example, a separate capacity threshold may be monitored for each network router or brick (e.g., based on the capacity of resource hosts connected to the network router). Multiple capacity thresholds may be implemented to provide tiered actions or responses to falling below a capacity threshold. For example, a first capacity threshold may indicate that available capacity has fallen into a deficient state, triggering the performance of various notifications that identify the change to the deficient state. While a second, lower capacity threshold may trigger higher priority notifications or responsive actions, such as shifting resource placements away from the affected locality.

In at least some embodiments, monitoring available capacity may be performed with respect to predicted available capacity, as discussed above with regard to FIG. 7. For instance, if predicated available capacity falls below a capacity threshold, then different (or similar) responsive actions may be performed. A notification may be sent, for example, indicating that available capacity predictions point to capacity falling below the capacity threshold at (or within) a predicted timeframe. Whereas, when actual (instead of predicted) available capacity falls below the capacity threshold, an automated responsive action, such as performing resource migrations to free capacity may be performed.

If available capacity is below a capacity threshold, as indicated by the positive exit from 820, then various responsive actions may be taken. Responsive actions may include sending various notifications, alerts, alarms, triggers, or recommendations, performing actions to divert new resource placements or migrate currently hosted resources, or any other action, such as generating an order or acquisition request for additional computing resource hosts to provide additional capacity or to move resource hosts from one infrastructure zone to another. Elements 830 through 880 discussed below provide some of the many different ways in which responsive actions may be performed, and thus are not intended to be limiting.

As indicated at 830, the locality to modify capacity may be identified, in various embodiments. In some instances, this identification may simply select the locality for which the capacity threshold has triggered (e.g., if the threshold for a particular data center or site has fallen below a particular threshold, then the data center or site indicated by the particular threshold may be identified). In cases where the capacity threshold does not identify a specific locality (or encompasses a very large locality, such as an entire data center), then the other techniques may be implemented to identify the locality to add capacity. A constrained network resource or group of resource hosts may be detected based on resource utilization. Infrastructure data, such as metadata describing the number of resource hosts in particular infrastructure zones (e.g., data center rooms with a certain number of server racks or empty space) may be used to identify the locality to modify capacity.

As indicated at 840, the amount and/or type of capacity to modify (e.g., move or add) may be determined. For instance, as with the identification of locality, the capacity threshold itself may define or determine the amount or type of capacity to add. If the capacity threshold is for a particular type of storage resource (e.g., solid state drives or magnetic disc drives), then capacity to increase the particular type of storage resources may be determined (e.g., more solid state drives or more magnetic disc drives). In some embodiments resource utilization data may indicate the type of computing devices to add for additional capacity or the location of spare resource hosts that can be moved to add capacity. If, processing throughput is heavily utilized, then procuring additional processing capacity may be determined as a way to provide increased capacity. Descriptions of standard configurations of new resource hosts and other devices may be evaluated in some embodiments to select the configuration of new resource hosts for the appropriate capacity need.

The amount of capacity to add may be determined in many different ways. For instance, capacity may be increased at a standard rate (e.g., adding a certain number of resource hosts or server racks at a time). Capacity may be added in amounts to equal or exceed the capacity threshold (e.g., sufficient resource hosts may be added to provide the difference in number of resources that can be placed currently and should be able to be placed according to the capacity threshold. In some embodiments, the amount of capacity that can be added may be constrained by other infrastructure limitations (e.g., space in a room, connections available to a particular router, or power resources at a data center). Thus, amounts or increases to capacity may be tempered or modified by these limitations.

As indicated at 850, a determination may be made as to when to modify capacity. The timing of adding capacity may be preconfigured or determined as to be performed immediately, or as the next capacity add operation in some priority or ordering scheme for adding capacity (e.g., if a queue or list of multiple capacity addition operations is maintained, the add operation may be placed at the front of the queue or list to be evaluated for selecting add capacity operations to be performed). The timing may be determined according to the capacity threshold, in various embodiments. For example, a capacity threshold may be triggered if 25% or less capacity remains. The capacity threshold may be set sufficiently high so that enough lead time remains to add new capacity as soon as possible before the remaining available capacity is exhausted (e.g., 2 weeks before the remaining 25% may be exhausted). The timing of when to add capacity may be determined based upon a calculated rate at which available capacity is decreasing. If, available capacity, decreases by 2 units per day, and 60 units of capacity remain, then the timing of adding new capacity may be set to within 30 days. Modeling or predicting available capacity, such as discussed above with regard to FIG. 7, may be performed to determine a rate at which available capacity declines and or predictions as to when no available capacity will remain. Timing, may also, indicated a specific timeslot, downtime, or other installation window, during which adding capacity may be performed. For instance, the necessary components, servers, networking devices, power supply devices, etc. may be on hand for installation, but adding capacity may involve interfering with the operation of other resource hosts. Therefore, an installation time window may be determined that least interferes with ongoing resource host operation.

The locality, amount or type of capacity, and timing of when to modify capacity as determined at elements 830-850 may be used in performing various responsive actions. The capacity threshold, or some other rule or configuration for monitoring available capacity, may identify the responsive action(s) to be taken in the event available capacity falls below the capacity threshold. These responsive actions may be performed in automated fashion, as indicated by the positive exit from 860, in some embodiments. For instance, an automation component or scheme may be implemented to automatically perform certain responsive actions to protect, move, or add capacity, as indicated at 870. Placement operations (or migration operations) moving into the identified locality may be aborted or diverted to another locality (if another locality is available, such as another network router or brick, data center room, or another data center site). In this way, no further resource placements in the locality may be performed (or a limited number of placements), preserving the available capacity in the locality until additional capacity is added or other responsive actions taken. Such steps may be performed automatically, by instructing a control plane component of a distributed system, such as a volume placement manager or other component directing resource placement operations to block placements in the locality. In some embodiments, responsive actions may include actively migrating or otherwise moving resources from the locality to other resource hosts in another locality in order to free up additional capacity. Automated acquisitions or purchase requests may be made or generated for final approval, identifying the amount and/or type of capacity to be included. Timing information, such as discussed above may be used when generating the acquisition or purchase requests, or performing migrations or blocking migrations, in order to determined when or for how long a responsive action should be performed.

As indicated by the negative exit from 860, a notification of the fall below the capacity threshold may be sent, in various embodiments, even if no other responsive action is performed. In some embodiments, the notification may be changing a portion of data in a particular location, such as a message board, status chart, database record, other data store, which may be polled by clients or other interested parties checking the available capacity of the distributed system. In at least some embodiments, the notification may include recommended responsive actions, along with the identified locality, determined amount or type of capacity, and when to modify capacity, as discussed above with regard to elements 830-850.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of analyzing resource placement fragmentation for capacity planning as described herein may be executed on one or more computer systems, which may interact with various other devices. FIG. 9 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.).

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A distributed system, comprising:
   a plurality of resource hosts configured to implement a plurality of resources for the distributed system;
   a capacity manager implemented via one or more hardware processors and memory and configured to:
   determine one or more fragmentation measures that indicate unutilized capacity at the plurality of resource hosts, wherein the unutilized capacity indicated by the one or more fragmentation measures comprises at least one of unutilized data storage capacity, unutilized processing capacity, unutilized throughput capacity, or unutilized network bandwidth capacity, and wherein the unutilized capacity indicated by the one or more fragmentation measures is incapable of hosting additional resources without violating one or more placement constraints for placing additional resources in the distributed system, so that the one or more fragmentation measures represent stranded capacity of the distributed system, the stranded capacity incapable of hosting additional resources while satisfying the one or more placement constraints, the stranded capacity comprising at least one of unutilized data storage capacity, unutilized processing capacity, unutilized throughput capacity, or unutilized network bandwidth capacity;

update, based at least in part on the one or more fragmentation measures that indicate unutilized capacity, a capacity model for the distributed system to indicate an updated available capacity of at least one of data storage, processing capacity, throughput capacity, or network bandwidth capacity for placing additional resources at the distributed system; and compare one of one or more capacity thresholds to the respective updated available capacity of the respective one of data storage, processing capacity, throughput capacity, or network bandwidth, to determine whether to trigger an action to add additional capacity for the respective one of data storage, processing capacity, throughput capacity, or network bandwidth to the distributed system.

2. The system of claim 1, wherein the capacity manager is further configured to:
monitor the available capacity in the capacity model; and
in response to a determination that the updated available capacity of at least one of data storage, processing capacity, throughput capacity, or network bandwidth capacity is below the capacity threshold, generate a capacity recommendation for the distributed system.

3. The system of claim 1, wherein the one or more placement constraints comprise one or more different minimum computing resource requirements to place a resource, and wherein determination of the one or more fragmentation measures comprises:
determination of a number of possible resource placements amongst the resource hosts that satisfy the one or more minimum computing resource requirements.

4. The system of claim 1, wherein the one or more placement constraints comprise an infrastructure diversity constraint to place a resource with respect to another one or more resources, and wherein determination of the one or more fragmentation measures comprises:
determination of a number of possible resource placements amongst the resource hosts that satisfy the infrastructure diversity constraint.

5. The system of claim 1, wherein the capacity manager is further configured to:
evaluate historical resource data to estimate future resource placements; and
generate a capacity forecast according to the determination of a future available capacity that is based at least in part on the estimated future resource placements.

6. The system of claim 1, wherein the capacity manager is further configured to:
monitor the available capacity in the capacity model; and
responsive to a determination that the updated available capacity of at least one of data storage, processing capacity, throughput capacity, or network bandwidth capacity crosses the respective capacity threshold, generate a capacity recommendation for the distributed system, wherein the capacity recommendation comprises at least one of:
a type of capacity to add; or
an amount of capacity to add.

7. The system of claim 1, wherein the resource hosts are associated with an infrastructure zone, wherein the available capacity comprises available capacity for placement of resources within the infrastructure zone, wherein the capacity manager is further configured to:
responsive to a determination that the available capacity crosses a capacity threshold for the infrastructure zone, generate a capacity recommendation that indicates a move of one or more of the resources from the infrastructure zone to another infrastructure zone.

8. A method, comprising:
performing, by one or more computing devices:
determining, for a distributed system comprising a plurality of resource hosts configured to implement a plurality of resources, one or more fragmentation measures that indicate unutilized capacity at the plurality of resource hosts, wherein the unutilized capacity indicated by the one or more fragmentation measures comprises at least one of unutilized data storage capacity, unutilized processing capacity, unutilized throughput capacity, or unutilized network bandwidth capacity, and wherein the unutilized capacity indicated by the one or more fragmentation measures is incapable of hosting additional resources without violating one or more placement constraints for placing additional resources in the distributed system, so that the one or more fragmentation measures represent stranded capacity of the distributed system, the stranded capacity incapable of hosting additional resources while satisfying the one or more placement constraints, the stranded capacity comprising at least one of unutilized data storage capacity, unutilized processing capacity, unutilized throughput capacity, or unutilized network bandwidth capacity;
updating, based at least in part on the one or more fragmentation measures that indicate unutilized capacity, a capacity model for the distributed system to indicate an updated available capacity of at least one of data storage, processing capacity, throughput capacity, or network bandwidth capacity for placing additional resources at the distributed system; and
comparing one of one or more capacity thresholds to the respective updated available capacity of the respective one of data storage, processing capacity, throughput capacity, or network bandwidth, to determine whether to trigger an action to add additional capacity for the respective one of data storage, processing capacity, throughput capacity, or network bandwidth to the distributed system.

9. The method of claim 8, further comprising:
monitoring the available capacity in the capacity model; and
in response to determining that the updated available capacity of at least one of data storage, processing capacity, throughput capacity, or network bandwidth capacity is below the respective capacity threshold, generating a capacity recommendation for the distributed system.

10. The method of claim 8, wherein the one or more placement constraints comprise one or more different minimum computing resource requirements to place a resource, and wherein determining the one or more fragmentation measures comprises:

determining a number of possible resource placements amongst the resource hosts that satisfy the one or more computing resource requirements.

11. The method of claim 8, wherein the one or more placement constraints comprise an infrastructure diversity constraint to place a resource with respect to another one or more resources, and wherein determining the one or more fragmentation measures comprises:

determining a number of possible resource placements amongst the resource hosts that satisfy the infrastructure diversity constraint.

12. The method of claim 8, further comprising:

evaluating historical resource data to estimate future resource placements; and generating a capacity forecast according to the determination of a future available capacity that is based at least in part on the estimated future resource placements.

13. The method of claim 8, further comprising:

monitoring the available capacity in the capacity model; and responsive to the determination that the updated available capacity of at least one of data storage, processing capacity, throughput capacity, or network bandwidth capacity crosses the respective capacity threshold, generating a capacity recommendation for the distributed system, wherein the capacity recommendation comprises at least one of:

a type of capacity to add; or an amount of capacity to add.

14. The method of claim 8, wherein the resource hosts are associated with an infrastructure zone, wherein the available capacity comprises available capacity for placement of resources within the infrastructure zone, further comprising:

responsive to determining that the available capacity crosses a capacity threshold for the infrastructure zone, generating a capacity recommendation that indicates a move of one or more of the resources from the infrastructure zone to another infrastructure zone.

15. One or more non-transitory computer-readable storage media storing program instructions that when executed on or across one or more processors cause the one or more processors to implement:

determining, for a distributed system comprising a plurality of resource hosts configured to implement a plurality of resources, one or more fragmentation measures that indicate unutilized capacity, wherein the unutilized capacity indicated by the one or more fragmentation measures comprises at least one of unutilized data storage capacity, unutilized processing capacity, unutilized throughput capacity, or unutilized network bandwidth capacity, and wherein the unutilized capacity indicated by the one or more fragmentation measures is incapable of hosting additional resources without violating one or more placement constraints for placing additional resources in the distributed system, so that the one or more fragmentation measures represent stranded capacity of the distributed system, the stranded capacity incapable of hosting additional resources while satisfying the one or more placement constraints, the stranded capacity comprising at least one of unutilized data storage capacity, unutilized processing capacity, unutilized throughput capacity, or unutilized network bandwidth capacity;

updating, based at least in part on the one or more fragmentation measures that indicate unutilized capacity, a capacity model for the distributed system to indicate an updated available capacity of at least one of data storage, processing capacity, throughput capacity, or network bandwidth capacity for placing additional resources at the distributed system; and comparing one of one or more capacity thresholds to the respective updated available capacity of the respective one of data storage, processing capacity, throughput capacity, or network bandwidth, to determine whether to trigger an action to add additional capacity for the respective one of data storage, processing capacity, throughput capacity, or network bandwidth to the distributed system.

16. The one or more non-transitory computer-readable storage media of claim 15, wherein the program instructions cause the one or more computing devices to further implement:

monitoring the available capacity in the capacity model; and in response to determining that the updated available capacity of at least one of data storage, processing capacity, throughput capacity, or network bandwidth capacity is below the respective capacity threshold, generating a capacity recommendation for the distributed system.

17. The one or more non-transitory computer-readable storage media of claim 15, wherein the one or more placement constraints comprise one or more different minimum computing resource requirements to place a resource, and wherein determining the one or more fragmentation measures comprises:

determining a number of possible resource placements amongst the resource hosts that satisfy the one or more computing resource requirements.

18. The one or more non-transitory computer-readable storage media of claim 15, wherein the one or more placement constraints comprise an infrastructure diversity constraint to place a resource with respect to another one or more resources, and wherein determining the one or more fragmentation measures comprises:

determining a number of possible resource placements amongst the resource hosts that satisfy the infrastructure diversity constraint.

19. The one or more non-transitory computer-readable storage media of claim 15, wherein the program instructions cause the one or more computing devices to further implement:

evaluating historical resource data to estimate future resource placements; and generating a capacity forecast according to the determination of a future available capacity that is based at least in part on the estimated future resource placements.

20. The one or more non-transitory computer-readable storage media of claim 15, wherein the program instructions cause the one or more computing devices to further implement:

monitoring the available capacity in the capacity model; and responsive to the determination that the updated available capacity of at least one of data storage, processing capacity, throughput capacity, or network bandwidth capacity crosses the respective capacity threshold, generating a capacity recommendation for the distributed system, wherein the capacity recommendation comprises at least one of:
a type of capacity to add; or
an amount of capacity to add.

* * * * *